(12) United States Patent
Oh et al.

(10) Patent No.: US 10,215,907 B2
(45) Date of Patent: Feb. 26, 2019

(54) SUBSTRATE FOR COLOR CONVERSION, MANUFACTURING METHOD THEREFOR, AND DISPLAY DEVICE COMPRISING SAME

(71) Applicant: Corning Precision Materials Co., Ltd., Chungcheongnam-do (KR)

(72) Inventors: Yoon Seuk Oh, Chungcheongnam-do (KR); Hyung Soo Moon, Chungcheongnam-do (KR); Ki Yeon Lee, Chungcheongnam-do (KR); Young Suk Lee, Chungcheongnam-do (KR); Nae Young Jung, Chungcheongnam-do (KR); Yoon Young Kwon, Chungcheongnam-do (KR); Choon Bong Yang, Chungcheongnam-do (KR)

(73) Assignee: Corning Precision Materials Co., Ltd. (KR)

( * ) Notice: Subject to any disclaimer, the term of this patent is extended or adjusted under 35 U.S.C. 154(b) by 48 days.

(21) Appl. No.: 15/515,873

(22) PCT Filed: Aug. 7, 2015

(86) PCT No.: PCT/KR2015/008278
§ 371 (c)(1),
(2) Date: Mar. 30, 2017

(87) PCT Pub. No.: WO2016/052856
PCT Pub. Date: Apr. 7, 2016

(65) Prior Publication Data
US 2017/0299792 A1 Oct. 19, 2017

(30) Foreign Application Priority Data
Sep. 30, 2014 (KR) .................. 10-2014-0130971

(51) Int. Cl.
*F21V 9/30* (2018.01)
*F21V 8/00* (2006.01)
*G02F 1/1335* (2006.01)

(52) U.S. Cl.
CPC ............... *G02B 6/005* (2013.01); *F21V 9/30* (2018.02); *G02B 6/0073* (2013.01);
(Continued)

(58) Field of Classification Search
CPC .... G02B 6/005; G02B 6/0073; G02B 6/0093; G02B 6/0003; G02B 6/0033;
(Continued)

(56) References Cited

U.S. PATENT DOCUMENTS

| 9,513,426 | B2 * | 12/2016 | Hong | .................. | G02B 6/0053 |
| 2004/0207995 | A1 * | 10/2004 | Park | .................... | G02B 6/0036 |
| | | | | | 362/611 |

(Continued)

FOREIGN PATENT DOCUMENTS

| KR | 1020120088273 A | 8/2012 |
| KR | 1020120095379 A | 8/2012 |

(Continued)

OTHER PUBLICATIONS

International Search Report for Application No. PCT/KR2015/008278 dated Dec. 4, 2015.

*Primary Examiner* — Bao Q Truong
(74) *Attorney, Agent, or Firm* — Lerner, David, Littenberg, Krumholz & Mentlik, LLP

(57) ABSTRACT

The present invention relates to a substrate for color conversion, a manufacturing method therefor, and a display device comprising the same and, more specifically, to a substrate for color conversion for not only securing the long-term stability of quantum dots but also exhibiting excellent color conversion efficiency, a manufacturing (Continued)

method therefor, and a display device comprising the same. To this end, the present invention provides a substrate for color conversion, a manufacturing method therefor, and a display device, the substrate for color conversion comprising: a thin plate glass; a coating layer for quantum dots formed on one surface of the thin plate glass; a light guide plate disposed to face the coating layer for quantum dots, a light emitting diode being disposed on the sides thereof; and a sealing material which is formed between the thin plate glass and the light guide plate and which blocks the coating layer for quantum dots from the outside.

14 Claims, 3 Drawing Sheets

(52) U.S. Cl.
CPC .............. *G02B 6/0093* (2013.01); *G02F 2001/133614* (2013.01); *G02F 2202/36* (2013.01)

(58) Field of Classification Search
CPC ....... G02B 6/0051; G02B 6/0053; F21V 9/30; F21V 9/32; F21V 2200/00; F21V 2200/30; G02F 2001/133614; G02F 2202/36
See application file for complete search history.

(56) References Cited

U.S. PATENT DOCUMENTS

| | | | |
|---|---|---|---|
| 2006/0109682 A1* | 5/2006 | Ko | G02B 6/0051 362/607 |
| 2010/0283072 A1* | 11/2010 | Kazlas | G02B 6/005 257/98 |
| 2012/0075837 A1* | 3/2012 | Um | G02B 6/0023 362/84 |
| 2012/0113354 A1* | 5/2012 | Park | G02F 1/133606 349/62 |
| 2012/0113672 A1* | 5/2012 | Dubrow | B82Y 20/00 362/602 |
| 2013/0009180 A1* | 1/2013 | Kim | G02B 6/0026 257/89 |
| 2015/0219311 A1* | 8/2015 | Cho | G02B 6/0065 362/608 |
| 2015/0226885 A1* | 8/2015 | Lee | G02B 1/18 362/84 |
| 2015/0285444 A1 | 10/2015 | Choi et al. | |

FOREIGN PATENT DOCUMENTS

| | | |
|---|---|---|
| KR | 1020130120486 A | 11/2013 |
| KR | 1020130121613 A | 11/2013 |
| KR | 1020140060449 A | 5/2014 |
| WO | 2012064562 A1 | 5/2012 |

* cited by examiner

SUBSTRATE FOR COLOR CONVERSION, MANUFACTURING METHOD THEREFOR, AND DISPLAY DEVICE COMPRISING SAME

CROSS-REFERENCE TO RELATED APPLICATION

This application is a national phase entry under 35 U.S.C. § 371 of International Application No. PCT/KR2015/008278, filed on Aug. 7, 2015, published in Korean, which claims priority to Korean Patent Application No. 10-2014-0130971, filed on Sep. 30, 2014, the disclosures of which are incorporated herein by reference.

BACKGROUND

Field

The present disclosure generally relates to a color conversion substrate, a method of fabricating the same, and a display device including the same. More particularly, the present disclosure relates to a color conversion substrate able to obtain long-term stability in quantum dots (QDs) and a superior degree of color conversion efficiency in the color conversion substrate, a method of fabricating the same, and a display device including the same.

Description of Related Art

A light-emitting diode (LED) is a semiconductor device formed of a compound such as gallium arsenide (GaAs) to emit light when an electrical current is applied thereto. The LED uses a p-n junction semiconductor structure into which minority carriers, such as electrons or holes, are injected, such that light is generated by the recombination of electrons and holes.

The characteristics of LEDs include low power consumption, a relatively long lifespan, the ability to be mounted in cramped spaces, and strong resistance to vibrations. LEDs are commonly used in display devices and in the backlight units of display devices. Recently, research into applying LEDs to general illumination devices has been undertaken. In addition to monochromatic LEDs, such as red, blue, or green LEDs, white LEDs have also come onto the market. In particular, a sharp increase in demand for white LEDs is anticipated, in line with the application of white LEDs to vehicle lighting devices and general lighting devices.

In the field of LED technology, white light is commonly generated using two main methods. The first method to generate white light includes disposing monochromatic LEDs, such as red, green, and blue LEDs, adjacently to each other such that various colors of light emitted by the monochromatic LEDs are mixed. However, color tones may change depending on the environment in which such devices are used, since individual monochromatic LEDs have different thermal or temporal characteristics. In particular, color stains may occur, making it difficult to uniformly mix different colors of light. The second method to generate white light includes applying a fluorescent material to an LED and mixing a portion of initial light emitted by the LED and secondary light of which wavelength has been converted by the fluorescent material. For example, a fluorescent material generating yellowish-green or yellow light may be used as a light excitation source on a blue LED, whereby white light can be produced by mixing blue light emitted by the blue LED and yellowish-green or yellow light excited by the fluorescent material. At present, the second method of realizing white light utilizing a blue LED and a fluorescent material is generally used.

Recently, quantum dots (QDs) have been used for color conversion to produce white light. QDs generate relatively strong light within a narrow wavelength, the light being stronger than light generated from a typical fluorescent material. In general, a QD-LED backlight unit generates white light by irradiating blue light emitted by a blue LED onto yellow QDs, and applies the white light to a liquid crystal display (LCD) as backlight. LCDs using such a QD-LED backlight unit have high potential as new displays, since the characteristics of such LCDs include superior color reproduction unlike those using a traditional backlight using LEDs only, the ability to realize full color comparable to that of organic light emitting diodes (OLEDs), as well as lower fabrication costs and higher manufacturing productivity than OLED TVs.

However, when QDs are continuously exposed to oxygen and moisture in an external air gap, defects may be formed on the surface of QDs, leading to problems, such as reduction in color conversion efficiency and change in color coordinates. Therefore, it is important to ensure the thermal stability of QDs and isolate QDs from the external air gap in order to apply QDs to a display device as a color (wavelength) conversion material.

RELATED ART DOCUMENT

Patent Document 1: United States Patent Application Publication No. 20120113672 (May 10, 2012)

BRIEF SUMMARY

Various aspects of the present disclosure provide a color conversion substrate able to obtain long-term stability and a superior degree of color conversion efficiency in quantum dots (QDs) and a superior degree of color conversion efficiency in the color conversion substrate, a method of fabricating the same, and a display device including the same.

According to an aspect, a color conversion substrate includes: a thin glass plate; a QD coating layer disposed on one surface of the thin glass plate; a light guide plate disposed to face the QD coating layer, wherein a light-emitting diode (LED) is disposed on a side of the light guide plate; and a sealant disposed between the thin glass plate and the light guide plate to isolate the QD coating layer from an external environment.

The QD coating layer may have an embossed pattern on a surface thereof facing the light guide plate.

The thin glass plate may have an embossed pattern on the other surface thereof.

The light guide plate may implemented as a glass light guide plate or a polymer light guide plate.

The sealant may be formed of a frit when the light guide plate is the glass light guide plate or is formed of an epoxy when the light guide plate is the polymer light guide plate.

The color conversion substrate may further include a moisture absorber disposed between the QD coating layer and the sealant.

According to another aspect, a color conversion substrate includes: a first thin glass plate; a QD coating layer disposed on the bottom surface of the first thin glass plate; a second thin glass plate in close contact with the bottom surface of the QD coating layer; a sealant disposed between the first thin glass plate and the second thin glass plate to isolate the QD coating layer from an external environment; and a light guide plate disposed under the second thin glass plate. An LED is disposed on a side of the light guide plate.

The QD coating layer may have an embossed pattern on the bottom surface thereof.

The first thin glass plate may have an embossed pattern on the top surface thereof.

The second thin glass plate may have an embossed pattern on the bottom surface thereof.

The sealant may be formed of a frit.

The color conversion substrate may further include a moisture absorber disposed between the QD coating layer and the sealant.

According to further another aspect, a display device includes: the above-stated color conversion substrate; a display panel disposed over the color conversion substrate; and an LED disposed on a side of the light guide plate of the color conversion substrate, and serving, together with the color conversion substrate, as a side emitting backlight unit.

The display panel may be implemented as a liquid crystal display (LCD) panel.

According to yet another aspect, a method of fabricating a color conversion substrate includes: forming a QD coating layer by coating a thin glass plate with a paste containing QDs; disposing a second thin glass plate or a light guide plate in a position facing the thin glass plate such that the QD coating layer is sandwiched between the second thin glass plate or the light guide plate and the thin glass plate; and hermetically bonding a periphery of a surface of the thin glass plate to a periphery of a surface of the second thin glass facing the surface of the thin glass plate or to a periphery of a surface of the light guide plate facing the surface of the thin glass plate by means of a sealant.

The operation of forming the QD coating layer may include forming an embossed pattern on the surface of the QD coating layer while adjusting the degree of curing the paste.

The sealant may be applied on the thin glass plate in the operation of forming the QD coating layer or may be applied on the second thin glass plate or the light guide plate in the operation of disposing the second thin glass plate or the light guide plate.

The sealant may be formed of a frit or an epoxy.

The method may further include disposing a moisture absorber around the QD coating layer.

As set forth above, a frit material and an epoxy material having superior sealing characteristics are applied as a sealant. It is therefore possible to protect the inner QD coating layer from both moisture and oxygen, thereby obtaining long-term stability of the QDs.

In addition, according to the present disclosure, the pattern formed on the surface of the QD coating layer scatters light that has been emitted by the LEDs and guided by the light guide plate before the light is wavelength-converted by the QDs. This enables the light to be additionally wavelength-converted, thereby improving color conversion efficiency. Furthermore, a pattern is formed on one surface of the thin glass plate exposed to air, with the QD coating layer formed on the other surface of the thin glass plate. It is possible to reduce the amount of light totally reflected from the interface between the thin glass plate and the air while the light is passing through the thin glass plate after passing through the QD coating layer. This can consequently increase the color conversion efficiency using the QDs and, furthermore, can reduce the number of LEDs used as a light source and the amount of energy consumed, whereby a high-efficient environmentally-friendly display device can ultimately be realized.

DETAILED DESCRIPTION

Figure 1:
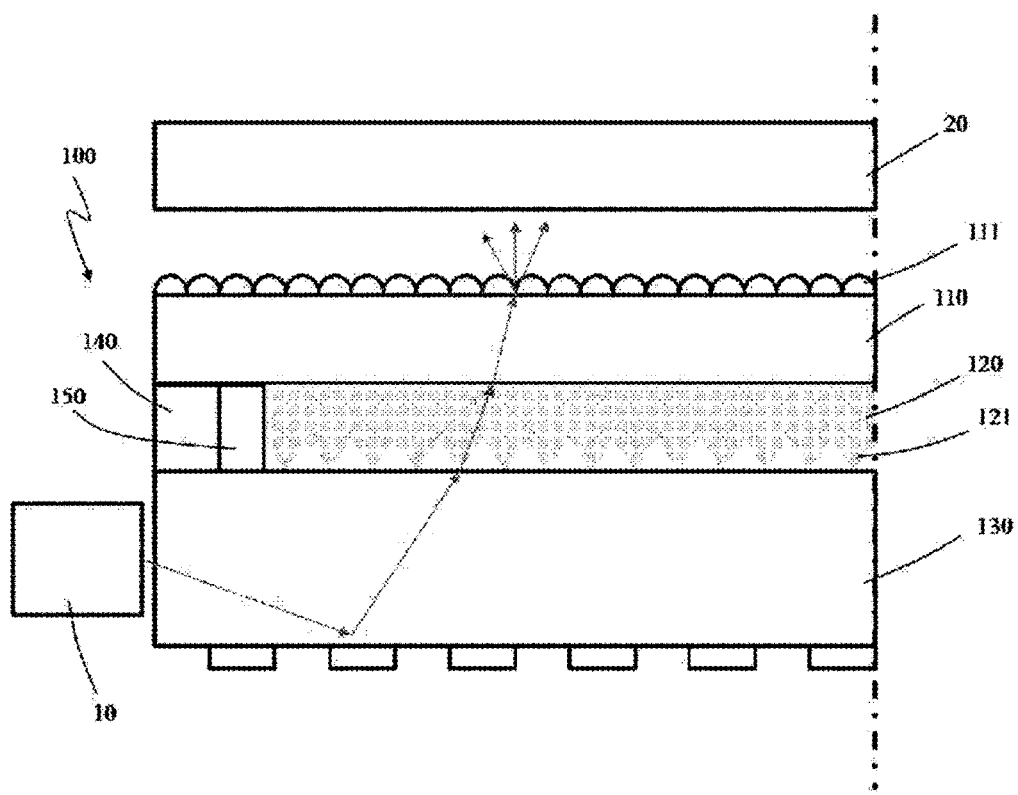
FIG. 1 is a cross-sectional view schematically illustrating a color conversion substrate and a display device including the same according to an exemplary embodiment.

Reference will now be made in detail to a color conversion substrate, a method of fabricating the same, and a display device including the same according to the present disclosure, embodiments of which are illustrated in the accompanying drawings and described below, so that a person skilled in the art to which the present disclosure relates could easily put the present disclosure into practice.

Throughout this document, reference should be made to the drawings, in which the same reference numerals and symbols will be used throughout the different drawings to designate the same or like components. In the following description, detailed descriptions of known functions and components incorporated herein will be omitted in the case that the subject matter of the present disclosure is rendered unclear by the inclusion thereof.

As illustrated in FIG. 1, a color conversion substrate 100 according to an embodiment is configured to convert the color (wavelength) of a portion of light emitted by one or more light-emitting diodes (LEDs) used as a backlight source of a display device, for example, a liquid crystal display (LCD). According to the present embodiment, the color conversion substrate 100 is disposed to the rear of a display panel 20 such as an LCD panel, and forms, together with one or more LEDs (hereinafter referred to as "LEDs") 10, an LCD backlight unit (BLU) radiating light toward the display panel 20. Although not illustrated in the drawings, each of the LEDs 10 may include an LED body and an LED chip. The LED body is a structure having a hollow portion in a specific shape, providing a structural space for accommodation of the LED chip. The LED body has wires and a lead frame by which the LED chip is electrically connected to an external power source. The LED chip is a light source emitting light when an electrical current is applied thereto by the external power source, is mounted on the LED body, and is connected to the external power source via the wires and the lead frame. The LED chip is implemented as a forward junction of an n-semiconductor layer that provides electrons and a p-semiconductor layer that provides holes. In the present embodiment, the backlight unit is implemented as a side emitting backlight. Accordingly, the LEDs 10 are disposed on one side of the color conversion substrate 100 to emit light toward the color conversion substrate 100.

In this manner, the color conversion substrate 100 according to the present embodiment forming the backlight unit of the display panel 20 together with the LEDs 10 includes a thin glass plate 110, a quantum dot (QD) coating layer 120, a light guide plate 130, and a sealant 140.

The thin glass plate 110 protects the QD coating layer 120 disposed on the bottom surface thereof (when referring to FIG. 1). In addition, the thin glass plate 110 serves as a path along which light emitted by the LEDs 10 passes or exits in the direction of the display panel 20 disposed above the thin glass plate 110. In addition, the thin glass plate 110 is bonded to the light guide plate 130 by the sealant 140, thereby isolating the QD coating layer 120 from the external environment. The thin glass plate 110 may formed of a material selected from among, but is not limited to, silicate glass, silica glass, borosilicate glass, and non-alkali glass, with a thickness of 0.3 mm or less. According to the present embodiment, the thin glass plate 110 provided as above can reduce the thickness of the color conversion substrate 100, thereby reducing the thickness of the display device.

According to the present embodiment, a pattern 111 having an embossed structure is formed on the top surface of the thin glass plate 110, i.e. the surface of the thin glass plate 110 facing the display panel 20. Although the pattern 111 is illustrated as having a semicircular cross-section in the present embodiment, this is merely illustrative, and the pattern 111 may have a variety of cross-sectional shapes.

The pattern 111 formed on the top surface of the thin glass plate 110 as above can reduce the amount of light that is totally reflected from the interface between the thin glass plate 110 and air while the light is passing through the thin glass plate 110. This can consequently increase the color conversion efficiency of QDs in the QD coating layer 120 and, furthermore, can reduce the number of LEDs 10 used as the light source and the amount of energy consumed, whereby a highly-efficient environmentally-friendly display device can ultimately be realized.

The QD coating layer 120 is disposed on the bottom surface of the thin glass plate 110. In addition, the QD coating layer 120 is hermetically sealed by the thin glass plate 110, the light guide plate 130 and the sealant 140, thereby being prevented from being exposed to the air. According to the present embodiment, it is possible to protect the QD coating layer 120 from both moisture and oxygen, thereby obtaining long-term stability in the QD coating layer 120. The QDs of the QD coating layer 120 convert the wavelength of light emitted by the LEDs 10, thereby generating wavelength-converted light, i.e. fluorescent light. According to the present embodiment, since the LEDs 10 are implemented as blue LEDs, the QD coating layer 120 may be formed of a QD material converting the wavelength of a portion of light emitted by the blue LEDs 10 into yellow light.

According to the present embodiment, a pattern 121 having an embossed structure is formed on the bottom surface of the QD coating layer 120, i.e. on the surface of the QD coating layer 120 facing the light guide plate 130. Although the embossed pattern 121 has a triangular cross-section as illustrated in FIG. 1, the embossed pattern 121 may have a variety of other shapes. Thus, the shape of the pattern 121 formed on the QD coating layer 120 is not limited to any specific shape. The embossed pattern 121 is formed on the bottom surface of the QD coating layer 120 through which light guided by the light guide plate 130 enters the QD coating layer 120, and thus serves to scatter the light to be wavelength-converted by the QD coating layer 120. This consequently enables additional wavelength conversion, thereby improving color conversion efficiency.

Figure 2:
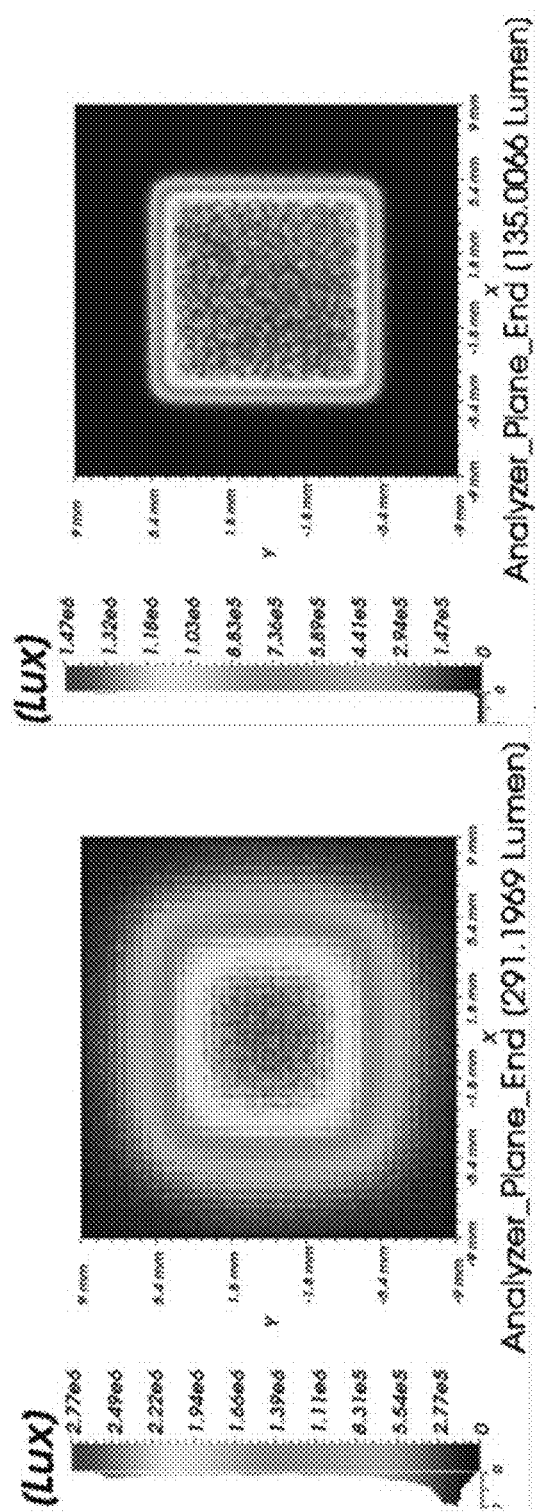
FIG. 2 illustrates simulated light diffusion patterns in a case in which an embossed pattern is formed on the surface of a QD coating layer (left) and a case in which the surface of the QD coating layer is flat (right)

FIG. 2 illustrates simulated light diffusion patterns demonstrating the effects of the pattern 121 formed on the surface of the QD coating layer 120. It is apparent that light is diffused in the case in which the pattern 121 is formed on the surface of the QD coating layer 120 (left), whereas substantially no light is diffused in the case in which the surface of the QD coating layer is flat (right).

The light guide plate (LGP) 130 is disposed to face the QD coating layer 120. The light guide plate 130 and the thin glass plate 110 are bonded by means of the sealant 140, thereby sealing the QD coating layer 120. In addition, the light guide plate 130 distributes light that is incident thereto after being emitted by a point light source of the LEDs 10, uniformly over the entire area of the display panel 20. That is, the light guide plate 130 guides the light emitted by the LEDs 10 in the direction of the QD coating layer 120 and the display panel 20.

According to the present embodiment, the light guide plate 130 may be implemented as a glass light guide plate or a polymer light guide plate. In addition, the thickness of the light guide plate 130 may be 1.0 mm or less.

The sealant 140 is disposed between the thin glass plate 110 and the light guide plate 130. Specifically, the sealant 140 is disposed between the bottom periphery of the thin glass plate 110, laterally spaced apart from the QD coating layer 120 on the bottom surface of the thin glass plate 110 and the top periphery of the light guide plate 130 corresponding to the bottom periphery. The sealant 140 disposed between the thin glass plate 110 and the light guide plate 130 is in a shape encircling the side surfaces of the QD coating layer 120, serving, together with the thin glass plate 110 and the light guide plate 130, to isolate the QD coating layer 120 from the external environment. When the light guide plate 130 is implemented as a glass light guide plate, the sealant 140 may be formed of a frit having superior ability in being bonded to the thin glass plate 110 and the glass light guide plate. When the light guide plate 130 is implemented as a polymer light guide plate, the sealant 140 may be formed of an epoxy.

The color conversion substrate 100 according to the present embodiment may include a moisture absorber 150 within an enclosed space defined by the thin glass plate 110, the sealant 140, and the light guide plate 130. When the moisture absorber 150 is disposed adjacently to the QD coating layer 120 within the enclosed space defined by the thin glass plate 110, the sealant 140, and the light guide plate 130, the moisture absorber 150 can prevent the QD coating layer 120 from being exposed to moisture, thereby further improving long-term stability of the QD coating layer 120.

Hereinafter, a color conversion substrate according to another exemplary embodiment will be described with reference to FIG. 3.

Figure 3:
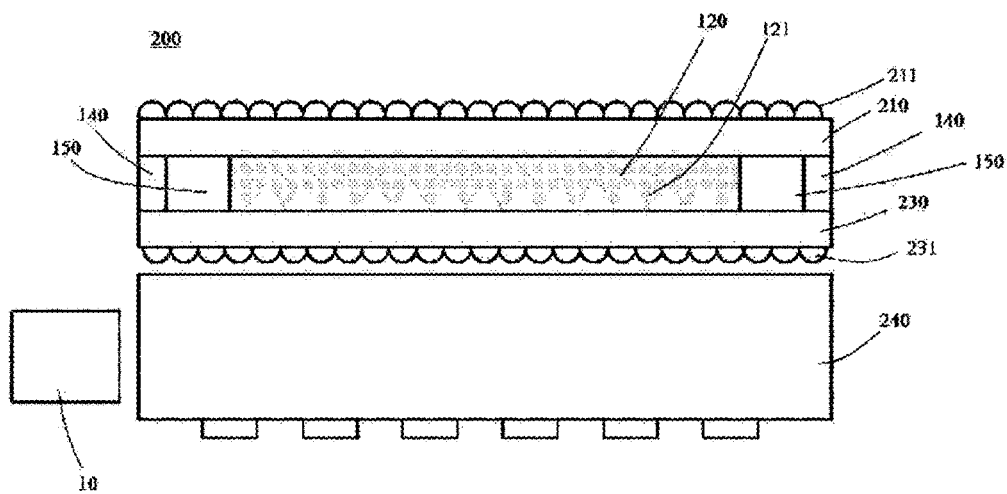
FIG. 3 is a cross-sectional view schematically illustrating a color conversion substrate and a display device including the same according to another exemplary embodiment.

FIG. 3 is a cross-sectional view schematically illustrating the color conversion substrate according to the another embodiment and a display device including the same.

As illustrated in FIG. 3, a color conversion substrate 200 includes a first thin glass plate 210, a QD coating layer 120, a second thin glass plate 230, a sealant 140, and a light guide plate 240.

The first thin glass plate 210 may formed of one material selected from among, but is not limited to, silicate glass, silica glass, borosilicate glass, and non-alkali glass, with a thickness of 0.5 mm or less, like the thin glass plate (110 in FIG. 1) according to the former embodiment. In addition, a pattern 211 having an embossed structure is formed on the top surface of the first thin glass plate 210. Descriptions of the functions and effects of the pattern 211 identical to those of the pattern (111 in FIG. 1) of the thin glass plate 110 according to the former embodiment will be omitted.

The QD coating layer 120 is disposed on the bottom layer of the first thin glass plate 210. Descriptions of the QD coating layer 120 identical to the QD coating layer (120 in FIG. 1) according to the former embodiment will be omitted.

The second thin glass plate 230 is in close contact with the bottom surface of the QD coating layer 120. The thickness and type of the second thin glass plate 230 may be identical to those of the first thin glass plate 210. A pattern 231 having an embossed structure 231 is disposed on the bottom surface of the second thin glass plate 230. The pattern 231 faces the light guide plate 240. The pattern 231 disposed on the bottom surface of the second thin glass plate 230 facing the light guide plate 240 increases lengths of paths along which light guided by the light guide plate 240 travels. This can consequently increase the contact between the light and the QD coating layer 120, thereby further increasing color conversion efficiency.

Unlike the former embodiment, the sealant 140 according to the present embodiment is disposed between the first thin glass plate 210 and the second thin glass plate 230 in order to isolate the QD coating layer 120 from the external environment. The sealant 140 may be formed of a frit having superior ability to be bonded to the first thin glass plate 210 and the second thin glass plate 230.

According to the present embodiment, the second thin glass plate 230 is bonded to the first thin glass plate 210 by means of the sealant 140, thereby sealing the QD coating layer 120 disposed on the bottom surface of the first thin glass plate 210. Due to this configuration, the light guide plate 240 is disposed under the second thin glass plate 230 in order to guide light emitted by LEDs 10 in the direction of the QD coating layer 120.

As in the former embodiment, the color conversion substrate 200 according to the present embodiment includes a moisture absorber 150 disposed between the QD coating layer 120 and the sealant 140.

Hereinafter, a method of fabricating a color conversion substrate according to an exemplary embodiment will be described. The reference numerals in FIG. 1 and FIG. 3 will be referred to for the components of the color conversion substrate.

First, a QD coating layer 120 is formed by coating a thin glass plate 110 with a paste containing QDs. In this case, a pattern 121 in an embossed structure may be formed on the surface of the QD coating layer 120 by adjusting the degree of curing the paste. In addition, a pattern 111 in an embossed structure may be formed on the surface of the thin glass plate 110 facing away from the surface coated with the paste.

Afterwards, the light guide plate 130 or a second thin glass plate 230 having a pattern 231 is disposed in a position facing the thin glass plate 110 such that the QD coating layer 120 is sandwiched between the light guide plate 130 or the second thin glass plate 230 and the thin glass plate 110. At this time, after the QD coating layer 120 is formed on the thin glass plate 110, a sealant 140 may be applied on the periphery of the thin glass plate 110 laterally spaced apart from the QD coating layer 120 or may be applied on the periphery of the second thin glass plate 230 or the light guide plate 130 that faces the thin glass plate 110.

Before the thin glass plate 230 or the light guide plate 130 is disposed in the position facing the QD coating layer 120, a moisture absorber 150 may be applied to on thin glass plate 110 between the QD coating layer 120 and the applied sealant 140, around the QD coating layer 120.

Finally, the thin glass plate 110 and the second thin glass plate 230 or the thin glass plate 110 and the light guide plate 130 are bonded to each other by firing the sealant 140 disposed therebetween, whereby the method of fabricating a color conversion substrate according to the present embodiment is completed.

It is preferable that the sealant 140 be formed of a frit when bonding the thin glass plate 110 and the second thin glass plate 230 or the thin glass plate 110 and the light guide plate 130 formed of glass. It is preferable that the sealant 140 be formed of an epoxy when bonding the thin glass plate 110 and the light guide plate 130 formed of a polymer.

In addition, when the QD coating layer 120 is sealed by bonding the thin glass plates 110 and 230, the light guide plate 240 is disposed under the thin glass plate 230, whereby light emitted by the LEDs 10 disposed on the side of the light guide plate 240 is guided to the QD coating layer 120.

The foregoing descriptions of specific exemplary embodiments of the present disclosure have been presented with respect to the drawings. They are not intended to be exhaustive or to limit the present disclosure to the precise forms disclosed, and obviously many modifications and variations are possible for a person having ordinary skill in the art in light of the above teachings.

It is intended therefore that the scope of the present disclosure not be limited to the foregoing embodiments, but be defined by the Claims appended hereto and their equivalents.

DESCRIPTION OF REFERENCE NUMERALS

100, 200: color conversion substrate
110: thin glass plate
120: quantum dot (QD) coating layer
130, 240: light guide plate
140: sealant
150: moisture absorber
210: first thin glass plate
230: second thin glass plate
111, 121, 211, 231: pattern
10: LED
20: display panel

What is claimed is:

1. A color conversion substrate comprising:
a thin glass plate;
a quantum dot coating layer disposed on one surface of the thin glass plate;
a light guide plate disposed to face the quantum dot coating layer, wherein a light-emitting diode is disposed on a side of the light guide plate; and
a sealant disposed between the thin glass plate and the light guide plate to isolate the quantum dot coating layer from an external environment,
wherein the quantum dot coating layer has an embossed pattern on a surface thereof facing the light guide plate,
wherein the embossed pattern is formed on the bottom surface of the quantum dot coating layer through which light guided by the light guide plate enters the quantum dot coating layer.

2. The color conversion substrate of claim 1, wherein the thin glass plate has an embossed pattern on the other surface thereof.

3. The color conversion substrate of claim 1, wherein the light guide plate comprises a glass light guide plate or a polymer light guide plate.

4. The color conversion substrate of claim 3, wherein the sealant is formed of a frit when the light guide plate comprises the glass light guide plate or is formed of an epoxy when the light guide plate comprises the polymer light guide plate.

5. The color conversion substrate of claim 1, further comprising a moisture absorber disposed between the quantum dot coating layer and the sealant.

6. A color conversion substrate comprising:
a first thin glass plate;
a quantum dot coating layer disposed on a bottom surface of the first thin glass plate;

a second thin glass plate in close contact with a bottom surface of the quantum dot coating layer;

a sealant disposed between the first thin glass plate and the second thin glass plate to isolate the quantum dot coating layer from an external environment; and a light guide plate disposed under the second thin glass plate, wherein a light-emitting diode is disposed on a side of the light guide plate, wherein the quantum dot coating layer has an embossed pattern on the bottom surface thereof, wherein the embossed pattern is formed on the bottom surface of the quantum dot coating layer through which light guided by the light guide plate enters the quantum dot coating layer.

7. The color conversion substrate of claim 6, wherein the first thin glass plate has an embossed pattern on a top surface thereof.

8. The color conversion substrate of claim 6, wherein the second thin glass plate has an embossed pattern on a bottom surface thereof.

9. The color conversion substrate of claim 6, wherein the sealant is formed of a frit.

10. The color conversion substrate of claim 6, further comprising a moisture absorber disposed between the quantum dot coating layer and the sealant.

11. A method of fabricating a color conversion substrate comprising:

forming a quantum dot coating layer by coating a thin glass plate with a paste containing quantum dots;

disposing a second thin glass plate or a light guide plate in a position facing the thin glass plate such that the quantum dot coating layer is sandwiched between the second thin glass plate or the light guide plate and the thin glass plate; and hermetically bonding a periphery of a surface of the thin glass plate to a periphery of a surface of the second thin glass facing the surface of the thin glass plate or to a periphery of a surface of the light guide plate facing the surface of the thin glass plate by means of a sealant, wherein forming the quantum dot coating layer comprises forming an embossed pattern on a surface of the quantum dot coating layer while adjusting a degree of curing the paste, wherein the embossed pattern is formed on the bottom surface of the quantum dot coating layer through which light guided by the light guide plate enters the quantum dot coating layer.

12. The method of claim 11, wherein the sealant is applied on the thin glass plate when forming the quantum dot coating layer or is applied on the second thin glass plate or the light guide plate when disposing the second thin glass plate or the light guide plate.

13. The method of claim 11, wherein the sealant is formed of a frit or an epoxy.

14. The method of claim 11, further comprising disposing a moisture absorber around the quantum dot coating layer.

* * * * *